United States Patent
Sahu et al.

(10) Patent No.: US 9,298,554 B2
(45) Date of Patent: Mar. 29, 2016

(54) METHOD AND APPARATUS FOR BOOTING PROCESSOR

(71) Applicants: Priti Sahu, Noida (IN); Poonam Aggrwal, Delhi (IN); Prabhakar Kushwaha, Delhi (IN); Ankit Pal, Noida (IN)

(72) Inventors: Priti Sahu, Noida (IN); Poonam Aggrwal, Delhi (IN); Prabhakar Kushwaha, Delhi (IN); Ankit Pal, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 202 days.

(21) Appl. No.: 14/261,407

(22) Filed: Apr. 24, 2014

(65) Prior Publication Data

US 2015/0309803 A1    Oct. 29, 2015

(51) Int. Cl.
*G06F 11/14* (2006.01)
*G06F 9/44* (2006.01)

(52) U.S. Cl.
CPC .......... *G06F 11/1417* (2013.01); *G06F 9/4401* (2013.01); *G06F 9/4403* (2013.01)

(58) Field of Classification Search
CPC .. G06F 11/1417; G06F 9/4401; G06F 9/4403
See application file for complete search history.

(56) References Cited

U.S. PATENT DOCUMENTS

| | | | |
|---|---|---|---|
| 7,003,659 B2 | 2/2006 | Rich et al. | |
| 8,065,563 B2 * | 11/2011 | Lai | G06F 9/4401 713/2 |
| 8,751,783 B2 * | 6/2014 | Piwonka | G06F 9/441 713/1 |
| 2004/0255000 A1 | 12/2004 | Simionescu et al. | |
| 2005/0033954 A1 * | 2/2005 | Wang | G06F 11/1417 713/2 |
| 2006/0020844 A1 * | 1/2006 | Gibbons | G06F 11/142 714/2 |
| 2006/0236150 A1 | 10/2006 | Lintz, Jr. et al. | |
| 2012/0210165 A1 | 8/2012 | Lambert et al. | |

* cited by examiner

*Primary Examiner* — Stefan Stoynov
(74) *Attorney, Agent, or Firm* — Charles E. Bergere

(57) ABSTRACT

A fail-safe booting system suitable for a system-on-chip (SOC) automatically detects and rectifies failures in power-on reset (POR) configuration or boot loader fetch operations. If a failure due to a boot loader fetch occurs, a POR configuration and boot loader are fetched from a different non-volatile memory. The reloading takes place from further different non-volatile memory sources if the boot loader fetch fails again. The automated system operates in accordance with a state machine, and does not involve any manual, on-board switch selection or manual re-programming.

12 Claims, 3 Drawing Sheets

METHOD AND APPARATUS FOR BOOTING PROCESSOR

BACKGROUND OF THE INVENTION

The present invention relates generally to processing circuits, and, more particularly, to a method and apparatus for booting a processor circuit.

Many processors have a "power-on reset" (POR) configuration stored in non-volatile memories, which gives the processors the flexibility to accommodate a large number of configuration parameters. Configuration parameters generally include frequencies of the various functional blocks of the processor (or of a system on a chip, SOC) such as cores and double data rate (DDR) memories, pin mixing configurations, etc. If the non-volatile memory that houses the POR configuration fails, the processing system may hang during boot or system reset. When a processing system is initially powered on, the first piece of code that runs is the boot loader. The boot loader loads the operating system and applications programs. However, there can be instances where the boot loader cannot be accessed due to a hardware failure. For example, the boot loader can become corrupted due to aging of flash devices. Failure of the system to fetch either the POR configurations or boot loader can be fatal to the system.

Known methods for recovering from a failure to fetch the POR configurations involve on-board switch selection for fetching the POR configuration from a different non-volatile memory or for selecting some default POR configuration. Known methods of recovery from a failure to fetch the boot loader involve updating the POR configuration by re-programming in order to fetch the boot loader from a different location of the same non-volatile memory or re-programming the boot loader using an external program. Such known methods of detection and recovery involve manual intervention, which is time consuming and cumbersome. Another drawback is that the detection of such failures is not automatic, consequently leading to high system downtimes.

Thus it would be advantageous to provide a means for automatically detecting and recovering from such failures.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
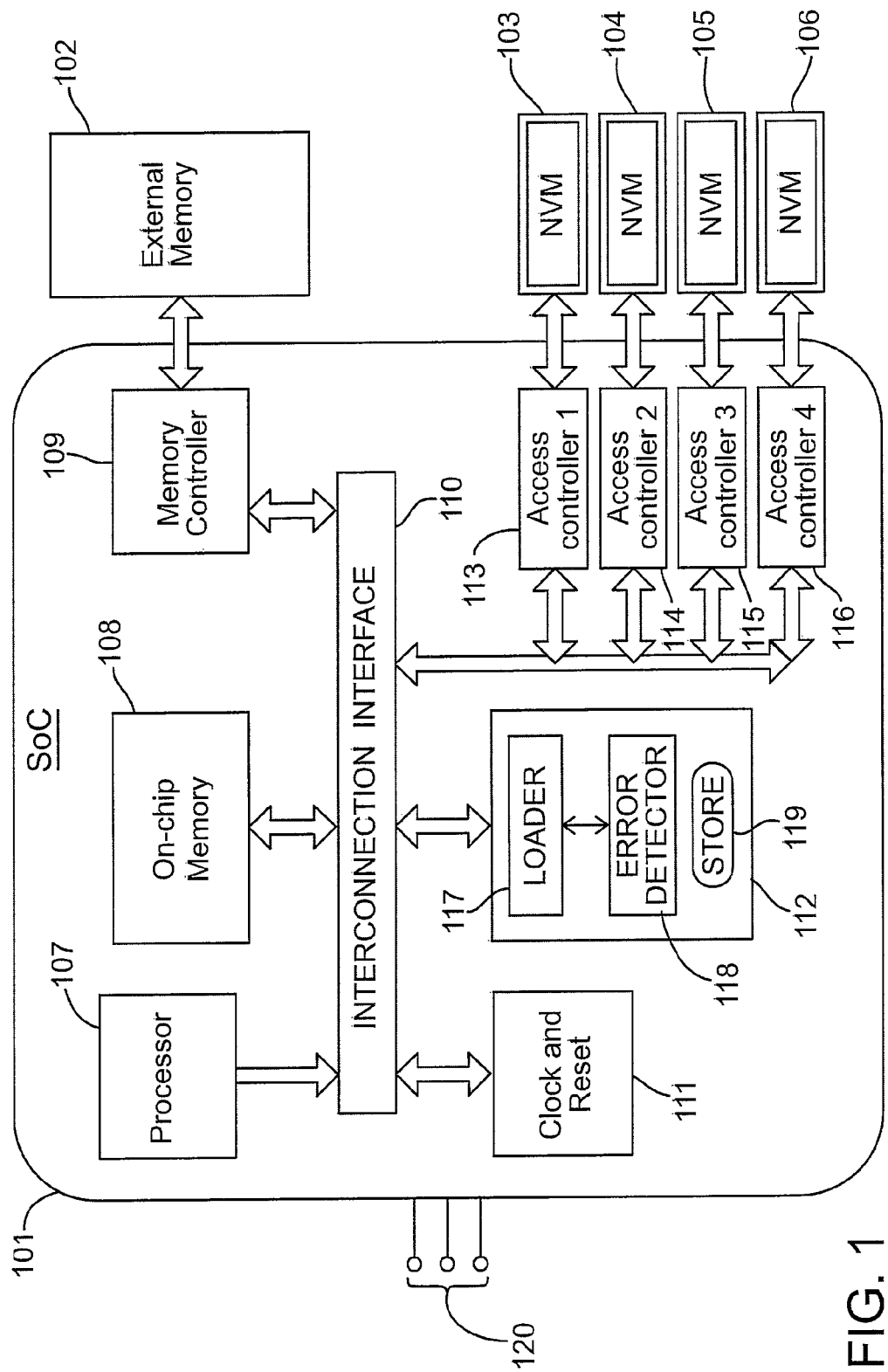
FIG. 1 is a simplified block diagram of a processing system including a booting apparatus in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides an apparatus for booting a processing system wherein the processing system includes a system memory and at least two memory devices. The at least two memory devices are used for storing a power-on reset (POR) configuration and a boot loader. The booting apparatus comprises an error detector for detecting a failure of a POR configuration fetch operation and a failure of a boot loader fetch operation. The booting apparatus also comprises a loader, coupled to the error detector, for fetching a POR configuration from one of said at least two memory devices if a failure in a POR configuration fetch operation from another of said at least two memory devices has been detected, and for fetching a boot loader from one of said at least two memory devices if a failure in a boot loader fetch operation from another of said at least two memory devices has been detected, and for transferring the fetched boot loader from said one of said at least two memory devices to the system memory.

In another embodiment, the present invention provides a method for booting a processing system that includes a system memory and at least two memory devices for storing a POR configuration and a boot loader. The method comprises performing a POR configuration fetch operation from one of said at least two memory devices, detecting a failure of said POR configuration fetch operation, performing a further POR configuration fetch operation from another of said at least two memory devices, performing a boot loader fetch operation from one of said at least two memory devices, detecting a failure of said boot loader fetch operation, performing a further boot loader fetch operation from another of said at least two memory devices, and transferring the fetched boot loader from said one of said at least two devices to the system memory.

The booting apparatus may be selectively enabled or disabled.

The present invention provides a fail-safe booting system and method that includes error detection and automatic recovery from system boot failures arising during POR configuration and boot loader fetch operation. Advantageously, no time consuming manual intervention is necessary in order to correct any failures.

The present invention enables detection and automatic recovery from a POR configuration fetch operation failure and/or a boot loader fetch operation failure due to, for example, non-volatile source failures.

In one embodiment, the origin of a failure is detected using one or more known techniques such as, for example, validating a cyclic redundancy check (CRC) of POR bits, I2C timeout, and interface data transfer errors in eSPI, SDHC, I2C.

In one embodiment, if a system failure is due to failure to fetch the POR configurations then the POR configurations are re-loaded from a different, non-volatile memory. Re-loading of the POR configurations may continue until all different locations housing the POR configurations have been exhausted. If a failure is still detected, a hard-coded POR configuration may be used for booting.

In one embodiment, if a system failure is due to a failure to fetch the boot loader, then a POR configuration is loaded from a different memory device (to point to a new boot loader) and in turn, a re-fetch of the boot loader will be made from a different memory device. This re-loading will occur again and from a different memory source if the boot loader fetch operation fails again.

In an alternative embodiment, a boot loader fetch from a different memory device operation can occur in isolation and may not necessarily require a POR configuration re-fetch.

Referring now to FIG. 1, a simplified block diagram of a booting apparatus in accordance with one embodiment of the present invention and implemented in a processing system is shown. In this embodiment, the processing system comprises a system-on chip (SOC) 101, which is coupled to an external memory 102 and a plurality of memory devices 103-106. The SOC 101 includes a processor 107, an 'on-chip' memory 108 (e.g., a Random Access Memory) and a memory controller 109, all of which are coupled to an interconnection interface 110. Also included in the SOC 101 and coupled to the interconnection interface 110 are a clock and reset module 111 and a booting module 112. Four access controllers 113-116 are also coupled to the interconnection controller 110 and to the NVMs 103-106 and enable the booting module 112 to access each of the NVMs. In this example, four memory devices are shown and comprise non-volatile memories (NVM). Typically, each NVM may comprise NOR/NAND/SPI Flash or SD/MMC card. Each NVM 103-106 houses the POR configuration and the boot loader for the processing system.

In this embodiment, the booting module 112 is implemented as a hardware block in the SOC 101. In other embodiments, the booting module 112 may be a separate integrated circuit and coupled to the SOC 101 by way of appropriate connection. The booting module 112 includes a loader 117, an error detector 118 and a memory 119 for housing a default POR configuration and default boot loader. In one embodiment, the booting module 112 is implemented as a state machine. The loader 117 fetches the POR configuration from a specified NVM 103-106 and also copies the boot loader, which has also been fetched from the specified NVM 103-106, to the on-chip memory 108.

The SOC 101 also includes pins 120 that are typically sampled by the SOC 101 when the system is powered on. At power-on, pin-sampling provides some POR configurations. These configurations provide preliminary configuration data that also specify a POR configuration source location that can be any one of the NVMs 103-106. Subsequently, the loader 117 loads POR configuration data from the specified NVM and fetches the boot loader from the specified NVM. The loader 117 configures the on-chip memory 109 and copies the fetched boot loader from the specified NVM into the on-chip memory 109. The loader 117 then hands over control to the fetched boot loader. Thus, the boot loader starts to execute and the conventional software boot process continues.

Figure 2:
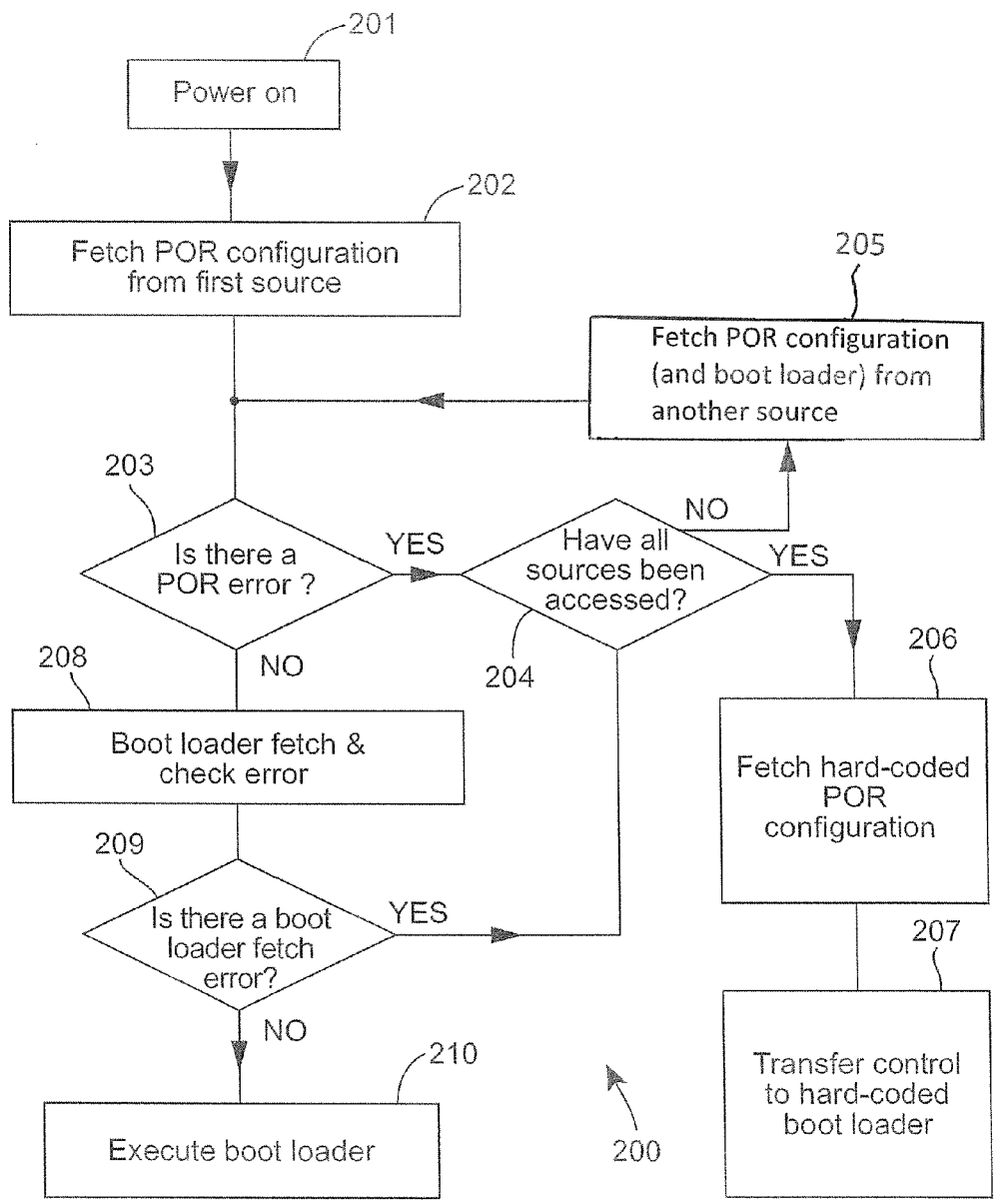
FIG. 2 is a simplified flow chart illustrating a method of booting a processing system in accordance with an embodiment of the present invention.

An example of a method 200 of booting the processing system of FIG. 1 will now be described with reference to the flow chart of FIG. 2. At 201, the processing system is powered on and the error detection and automatic failure recovery functionality of booting module 112 is enabled. At 202, the POR configuration is fetched from the specified NVM 103-106 by the loader 117. At 203, it is determined, by the error detector 118, if a failure of the POR configuration fetch operation has occurred. This error detection can be done, for example, by validating a CRC of POR configuration bits or by detecting various device errors such as timeouts, interface data transfer errors in eSPI, SDHC, I2C. If an error is detected, then at 204, it is determined whether or not all sources of POR configuration i.e., all NVMs, have been accessed. If not, then another NVM is accessed at 205 and the POR configuration is fetched from this alternative source and checked again for errors. If a POR error is found again then the steps 204, 205, 203 are repeated until all alternative sources have been exhausted. If no error-free POR configuration fetch operation has been successful, then, at 206, the loader 117 fetches the default hard-coded POR configuration from the memory 119 for execution and transfers, at 207, the control to a hardcoded or default boot loader, which could be a minimalistic one. This minimalistic boot loader will not be a fully-fledged one but will be sufficient to recover the system. In one example, the default/hardcoded boot loader is stored in a read only memory comprising the memory 119.

In cases where, at 203, no POR error is found, the method progresses to 208 where it is determined, by the error detector 118, if a failure of the boot loader fetch operation has occurred. This error detection can be done, for example, by validating a CRC of the boot loader or by detecting various device errors such as timeouts, interface data transfer errors in eSPI, SDHC, I2C. If an error is detected, then the method reverts to 204, where it is determined whether or not all sources have been accessed. If not, then another NVM consisting of POR configuration and boot loader is accessed at 205. The POR configuration and boot loader is fetched from this alternative source and checked again for errors. If there is no failure, at 209, the method moves to 210 for boot loader execution. If a boot loader fetch error is found again the steps 204, 205, 203, 208, 209 are repeated until all alternative sources have been exhausted. In this case, step 203 takes care of POR configuration errors. If no error-free POR configuration and boot loader fetch operation has been successful, then, at 206, the loader 117 fetches default hard-coded POR configuration from the memory 119 for execution and transfers the control to a hard-coded boot loader which may be a minimalistic. This minimalistic boot loader will not be a fully-fledged one but will be sufficient to recover the system. In one example, the default/hard-coded boot loader is stored in a read-only memory comprising the memory 119. In cases where, at 209, no error is found, the method progresses to 210 where the fetched boot loader is executed.

In an alternative embodiment, a boot loader fetch in isolation can occur from a different non-volatile memory and may not necessarily require a POR re-fetch.

Figure 3:
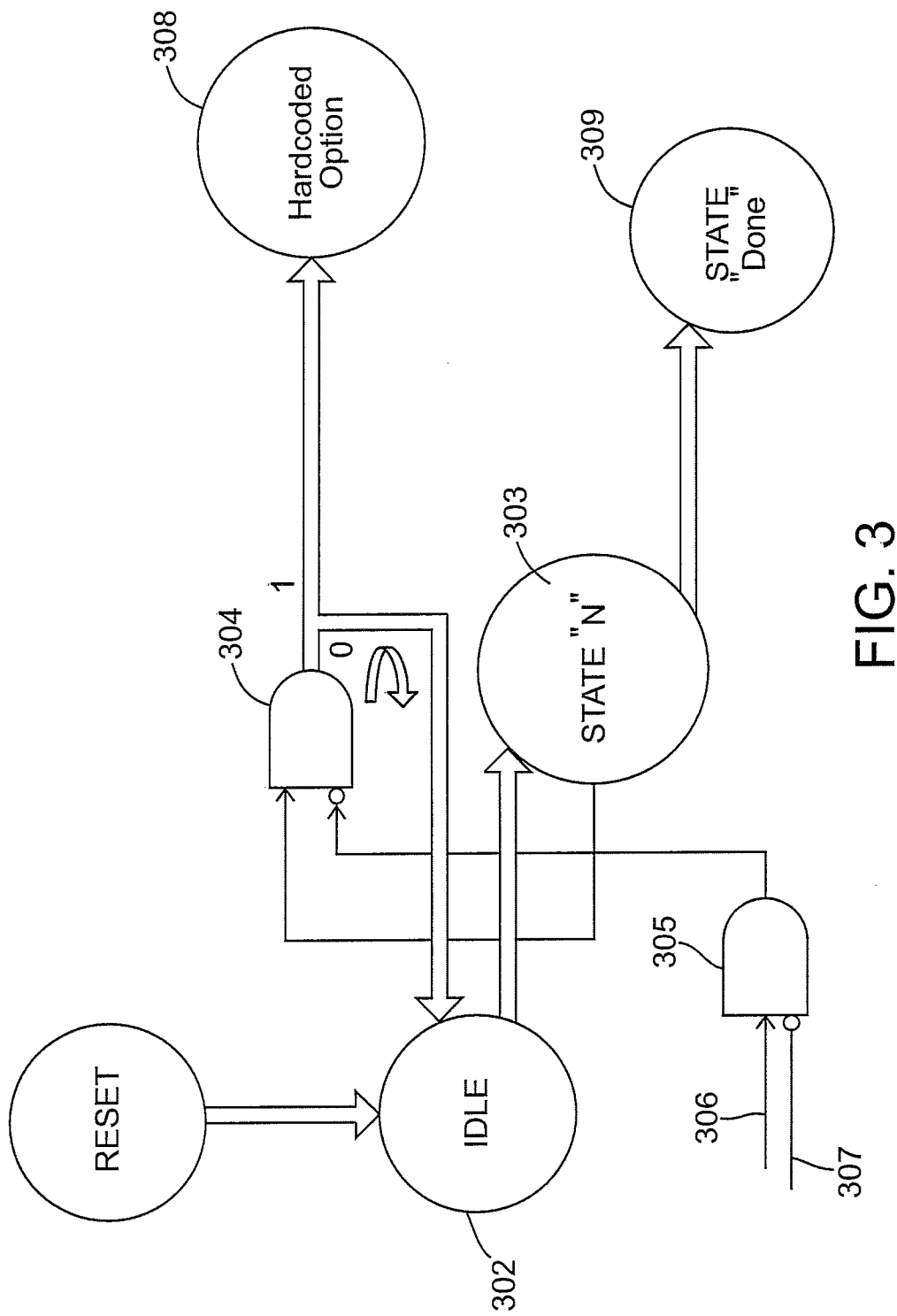
FIG. 3 is a simplified block diagram illustrating operation of a state machine when performing a method in accordance with an embodiment of the present invention.

Referring now to FIG. 3, operation of a booting module in accordance with an embodiment of the invention and implemented in a state machine will now be described. At power-on, the state machine is in a reset state 301. Subsequently, the state machine moves to an idle state 302 during which a POR configuration fetch followed by a boot loader fetch is done. Next, the state machine moves to a state 'N' at 303 during which error checking is done. Any detected error may originate from, for example, a POR configuration CRC error, time-out, boot loader CRC error, etc. If an error is seen at 303 then a first logic gate 304 resolves to move the state machine back to the idle state 302 with a different POR configuration source. This continues until no POR configuration fetch error is detected or all POR configuration fetch sources are exhausted.

In a fail-safe boot enabled mode, which is controlled by a second logic gate 305 in response to a 'fail safe boot enable' signal on line 306 and a 'last boot source exhausted' signal on line 307, if all sources have been exhausted and an error is still detected, then the first logic gate 304 resolves to move the state machine to a default hard coded option 308.

When no error is detected for a particular POR configuration and boot loader source, then the state machine moves to 'state done' 309.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the pre-boot loader module and the error detection module may be implemented in a single module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In one embodiment, the entire functionality of the modules shown in FIG. 1 may be implemented in a single integrated circuit. Such an integrated circuit may be a package containing one or more dies. Alternatively, the loader and error detector of FIG. 1 may be implemented in a single device and interconnected with the other modules of FIG. 1 in a suitable manner. For example, an integrated circuit device may comprise one or more dies in a single package with circuitry provided on the dies that forms the modules and which are connectable to other components outside the package through suitable connections such as package pins and bond wires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, processors, workstations, personal computers, notepads, personal digital assistants, electronic games, automotive and other embedded systems, cell phones and various other wireless devices, commonly denoted in this application as 'processing systems'.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A An apparatus for booting a processing system, wherein the processing system includes a system memory and at least two memory devices, the at least two memory devices for storing a power-on reset (POR) configuration and a boot loader, the apparatus comprising:
   an error detector for detecting a failure of a POR configuration fetch operation and a failure of a boot loader fetch operation; and
   a loader, coupled to the error detector, for fetching a POR configuration from one of the at least two memory devices if a failure in a POR fetch operation from another of the at least two memory devices has been detected, and for fetching a boot loader from one of the at least two memory devices if a failure in a boot loader fetch operation from another of the at least two memory devices has been detected, and for transferring the fetched boot loader from the one of the at least two memory devices to the system memory.

2. The apparatus of claim 1, wherein the loader is arranged to fetch a POR configuration from one of the at least two memory devices if a failure in a boot loader fetch operation from another of the at least two memory devices has been detected.

3. The apparatus of claim 1, further comprising a storage device for storing a hard-coded POR configuration, and wherein the loader is arranged to fetch the hard-coded POR configuration if failures in POR configuration fetch operations from the at least two memory devices are detected.

4. The apparatus of claim 3, wherein the storage device contains a hard-coded boot loader.

5. The apparatus of claim 4, wherein the storage device is a read only memory.

6. The apparatus of claim 1, wherein the at least two memory devices are non-volatile memories.

7. The apparatus of claim 1, wherein the error detector and loader are implemented in a state machine.

8. The apparatus of claim 7, wherein the state machine is arranged to move to an 'idle' state during which a fetch operation from a first source is performed, and to subsequently move to an 'error checking' state, and if an error is detected in a fetch operation, to revert to the 'idle' state during which a further fetch operation from a second source is performed, and to move to a 'done' state when no error is detected.

9. An integrated circuit, comprising:
a system memory;
at least two non-volatile memory devices for storing a power-on reset (POR) configuration and a boot loader; and
a state machine for detecting a failure of a POR configuration fetch operation and a failure of a boot loader fetch operation, and for fetching a POR configuration from one of the non-volatile memory devices if a failure in a POR fetch operation from another of the non-volatile memory devices is detected, and for fetching a boot loader from one of the non-volatile memory devices if a failure of a boot loader fetch operation from another of the non-volatile memory devices is detected, and for transferring the fetched boot loader from the one of the non-volatile memory devices to the system memory.

10. The integrated circuit of claim 9, wherein the state machine is arranged to fetch a POR configuration from one of the at least two memory devices if a failure in a boot loader fetch operation from another of the at least two memory devices has been detected.

11. A method for booting a processing system that includes a system memory and at least two memory devices for storing a power-on reset (POR) configuration and a boot loader, the method comprising:
fetching a POR configuration from one of the at least two memory devices;
detecting a failure of the fetching of the POR configuration;
performing a further POR configuration fetch operation from the other of the at least two memory devices;
fetching a boot loader from one of the at least two memory devices;
detecting a failure of the fetching of the boot loader;
performing a further boot loader fetch operation from the other of the at least two memory devices; and
transferring the fetched boot loader from the one of the at least two memory devices to the system memory.

12. The method of claim 11, further comprising performing a further POR configuration fetch operation from another of the at least two memory devices on detecting a failure of the boot loader fetch operation.

* * * * *